United States Patent [19]

Lenander et al.

[11] Patent Number: 4,563,644
[45] Date of Patent: Jan. 7, 1986

[54] DEVICE FOR DETECTING METALLIC OBJECTS IN A FLOW OF NON-METALLIC MATERIAL

[75] Inventors: Bo Lenander; Lennart Thegel, both of Västerås, Sweden

[73] Assignee: Asea Aktiebolag, Västerås, Sweden

[21] Appl. No.: 480,281

[22] Filed: Mar. 30, 1983

[30] Foreign Application Priority Data

Apr. 1, 1982 [SE] Sweden .............................. 8202094

[51] Int. Cl.$^4$ ..................... G01N 27/74; G01R 33/12
[52] U.S. Cl. ................................... 324/232; 324/204; 324/233; 324/239
[58] Field of Search ............................. 324/232–243, 324/204, 326–329, 207

[56] References Cited

U.S. PATENT DOCUMENTS

| | | | |
|---|---|---|---|
| 3,686,564 | 8/1972 | Mallick, Jr. et al. | 324/232 |
| 3,848,182 | 11/1974 | Gerner et al. | 324/233 |
| 4,006,407 | 2/1977 | Flaherty et al. | 324/233 |
| 4,237,419 | 12/1980 | Törnblom et al. | 324/232 X |
| 4,303,885 | 12/1981 | Davis et al. | 324/232 X |
| 4,331,920 | 5/1982 | Kalisch et al. | 324/233 X |
| 4,424,486 | 1/1984 | Denton et al. | 324/233 X |

FOREIGN PATENT DOCUMENTS 66774 5/1980 Japan .................................. 324/233

Primary Examiner—Gerard R. Strecker
Assistant Examiner—Warren S. Edmonds
Attorney, Agent, or Firm—Watson Cole Grindle & Watson

[57] ABSTRACT

A device for detecting metallic objects in a material flow, comprising as sensing member a scanning coil consisting of a primary coil and, for example, two oppositely connected secondary windings arranged symmetrically around the primary winding so that the voltage induced in the secondary winding becomes zero as long as no conducting objects appear in the scanning area. To eliminate irrelevant signals from conducting objects in the vicinity of the scanning coil but not in the material flow or from weakly conducting objects in the material flow, the primary winding is fed with at least two alternating currents having different frequencies. The corresponding secondary voltages are rectified in phase-controlled rectifiers, and in a calculating circuit the difference is derived between the output of one rectifier voltage and the output of another rectifier multiplied by a constant factor which includes the relation between the frequencies of the corresponding alternating voltages.

12 Claims, 6 Drawing Figures

DEVICE FOR DETECTING METALLIC OBJECTS IN A FLOW OF NON-METALLIC MATERIAL

BACKGROUND OF THE INVENTION

The present invention relates to a device for detecting metallic objects in a flow of non-metallic material which comprises a scanning coil having a primary coil and a secondary coil, a current source adapted to feed at least two alternating currents with different frequencies to the primary coil, and an output circuit for the secondary coil, said output circuit delivering a signal when a metal object enters into the sensing range of the scanning coil.

Devices of the above-mentioned kind are used, among other things, for detecting metallic objects in a flow of materials such as coal, ore, logs, wood chips, wood pulp or the like non-metallic materials, the scanning coil being so designed and positioned that the flow of material moves past or, even better, through the scanning coil.

The scanning coil is suitably constructed with a primary coil and a secondary coil which is divided into two similar coils located symmetrically on opposite sides of the primary coil in the direction of material flow through the scanning coil. The secondary coils are connected such that the output signal therefrom is balanced, so that it becomes approximately zero all the while no metallic object appears within the sensing range of the coil. In this way the detector device can be designed to operate with very high sensitivity.

The problem is, however, that a consequence of high sensitivity is a greater risk of signals being generated by harmless or uninteresting objects, for example objects in the material flow having a low conductivity or larger objects of iron or metal in the vicinity of the scanning coil, but not in the material flow. As examples of objects with low conductivity may be mentioned wet logs of wood or other moist material.

An object of the present invention is to eliminate such erroneous signals without significant loss of sensitivity for the detecting of foreign matter in the material flow.

BRIEF STATEMENT OF THE INVENTION

This desirable object is achieved, according to the invention by supplying the primary winding of the scanning coil with an alternating current composed of at least two alternating currents having different frequencies. The invention is characterised in that the output circuit of the secondary coil includes a phase-controlled rectifier for each one of the alternating currents, each of the phase-controlled rectifiers being controlled with a certain phase angle relative to the respective alternating current, and a calculating circuit adapted to derive the difference between the output voltage of one rectifier and the product of the output voltage of another rectifier and a factor containing the relationship between the frequencies of the respective alternating currents.

By phase-controlled rectification, the corresponding secondary voltages are filtered away from each other, whereafter the signals corresponding to undesired metallic objects in the material flow can be obtained in the calculating circuit, whereas uninteresting objects do not generate such signals.

By using currents with different frequencies and matching together the corresponding rectified secondary voltages in a proper manner, it will be possible according to the invention to distinguish between uninteresting objects and the foreign matter in the material flow which it is desired to detect.

Similar principles to those used in this invention are previously known from other forms of metal detection, for example for detecting objects of value, guns and the like, in the earth, but in those cases the evaluation of the signals is different from that proposed by the present invention.

Desirably, the rectification of the secondary voltages is controlled with a phase angle equal to zero or at least close to zero, whereby the imaginary parts of the signals are filtered off, which may otherwise give rise to disturbances.

BRIEF DESCRIPTION OF THE DRAWINGS

The invention will now be further described, by way of example, with reference to the accompanying drawings, in which.

DESCRIPTION OF PREFERRED EMBODIMENT

Figure 1:
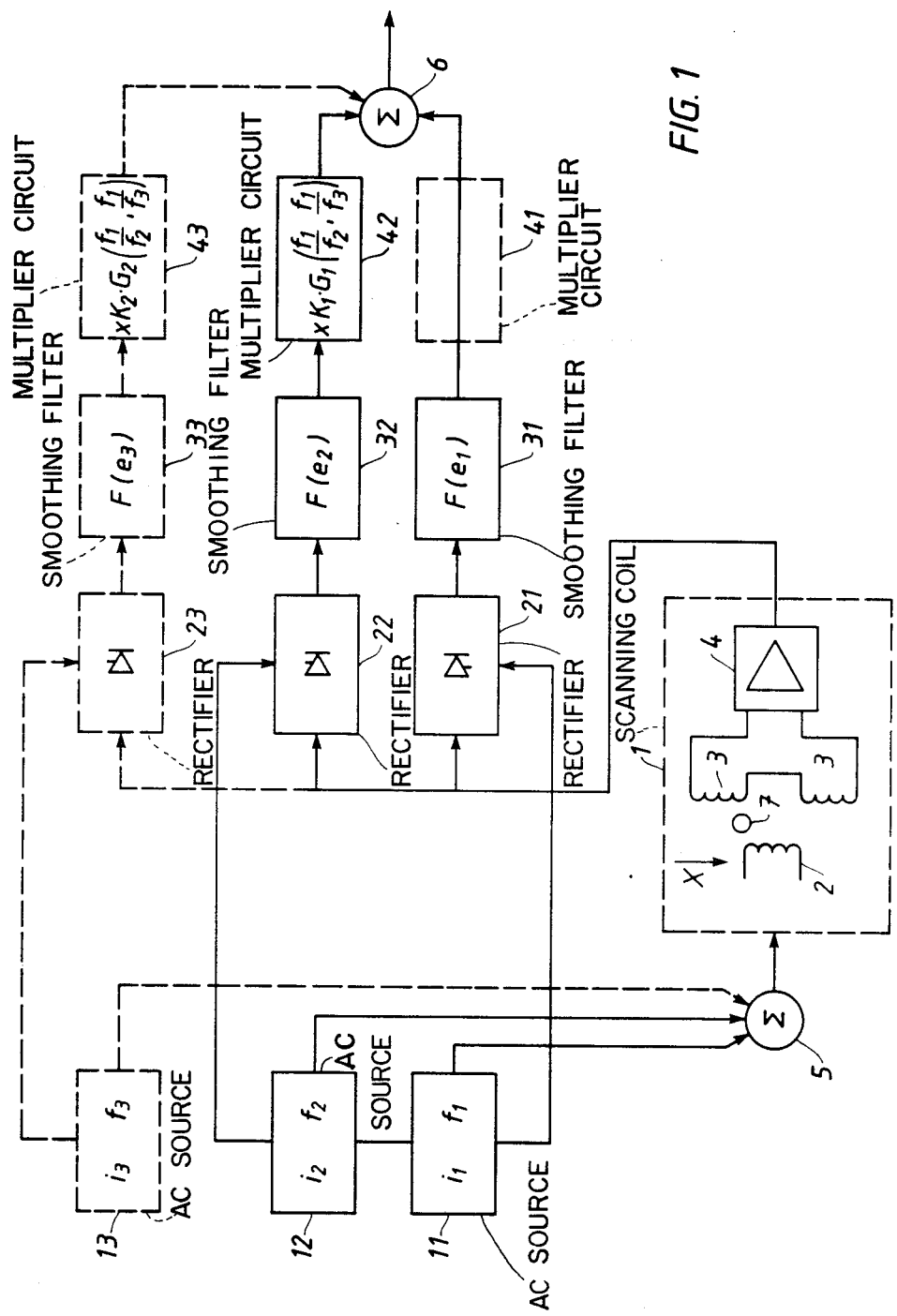
FIG. 1 shows in schematic form the principle of a device according to the invention.
Figure 2:
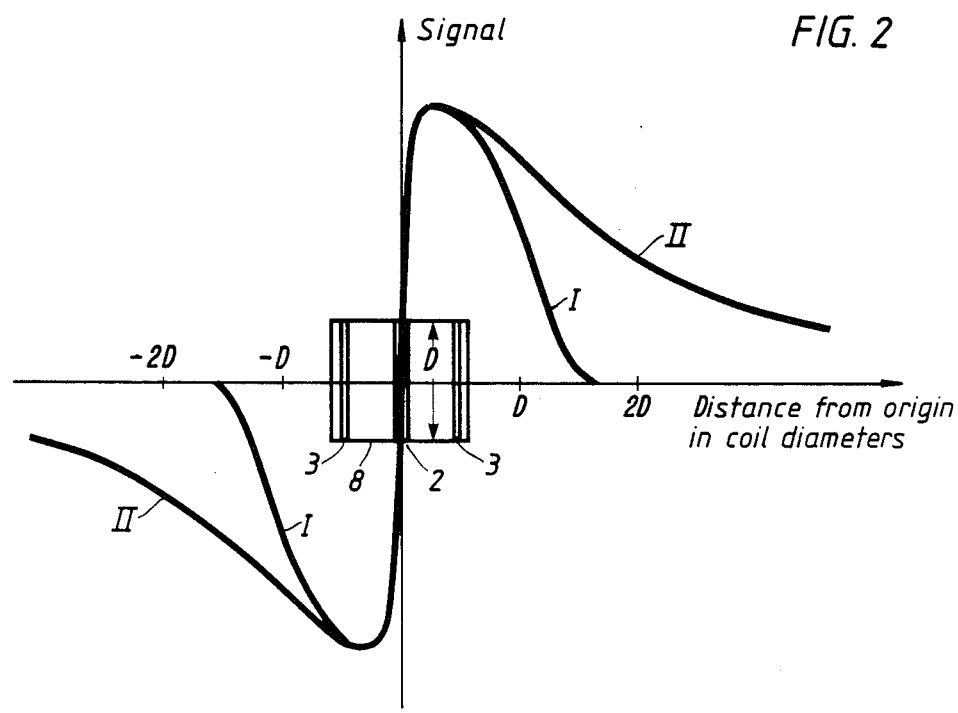
FIG. 2 shows the scanning coil of the device of FIG. 1 and the output signal resulting therefrom when a metal particle passes through it.

FIG. 1 shows schematically in the chain line box 1 the scanning coil of a device according to the invention. The scanning coil comprises a primary coil 2 and two secondary coils 3 interconnected such that the induced voltages in each of the secondary coils are oppositely disposed to one another and the two secondary coils are connected to an amplifier 4, from where the output signal is passed out for further processing. The coils 2 and 3 are suitably located around a tube, through which the material flow is conducted in the direction of the arrow X. The scanning coil is illustrated in FIG. 2 and will be described in greater detail later.

The primary coil 2 is supplied with a composite a.c. current from a summator 5. At least two, and in the case illustrated in FIG. 1 three, AC sources 11, 12, 13 are connected to the summator 5. The a.c. currents (i1, i2 and i3) have different frequencies f1, f2 and f3.

The output voltage from the amplifier 4 is connected to rectifiers 21, 22 and 23 respectively corresponding to each of the supply alternating currents. These rectifiers are parallel-connected and are controlled from the respective alternating current source with a certain phase angle, which is chosen to be the same for all the rectifiers.

The a.c. currents i1, i2 and i3 are suitably chosen with such an amplitude that the voltages e1, e2 and e3 induced thereby in the secondary windings 3 will have the same root mean square (RMS) value, which means that the currents are chosen in relation to the frequencies so that the product of their RMS values and frequencies are the same for all, that is, $i1 \times f1 = i2 \times f2 = i3 \times f3$.

Theoretically different control angles for the rectifiers might be considered. If control is performed with the control angle 0°, a measure is obtained of the real portion of the output voltage, and if control is performed with the control angle 90°, the imaginary portion of this voltage is obtained. By choosing the control angle 0°, the real portion is obtained, as mentioned which corresponds to the resistive losses in conductive materials in the material flow. This is normally preferable, since the majority of disturbances, such as vibrations in the scanning coil, magnetic background material, etc., for the most part influence the imaginary portion of the signal. However, this does not exclude that in certain cases it may be convenient to deviate from the control angle 0° and possibly in certain cases even use the imaginary portion by operating at the control angle 90°.

By controlling the different rectifiers 21, 22 and 23 with the same phase angle or control angle in relation to the corresponding primary current, a signal is obtained from each rectifier corresponding to this current component, whereas signals of other frequency are suppressed. This effect is amplified if the different frequencies are in an integer relationship to each other, more particularly, when the relationships between them are divisible by two. To avoid disturbing overtones, the primary currents should in addition, be as close to sinusoidal as possible.

The output signals from the rectifiers 21, 22 and 23 are respectively smoothed in smoothing filters 31, 32 and 33, from where direct voltage signals F(e) are obtained corresponding to the different secondary voltages e1, e2, e3. These signals are processed in a calculating circuit comprising a summator 6 for the different signals. The signal corresponding to the voltage with the lowest frequency, in the illustrated case e1, is suitably directly connected to the summator 6. The other signals are multiplied by a factor $k \times G((f1/f2),(f1/f3))$, where k is a constant factor, normally of the order of magnitude 1, and G is a function of the relationship between the frequencies, as will be described in more detail later. The number of different frequencies and associated rectifiers, etc., that are needed and how the corresponding signals are to be processed, depends on what disturbances are to be eliminated and this will be explained in greater detail hereafter.

Before that, however, reference will now be made to FIG. 2 which shows how the scanning coil can be constructed and how the signal increases when a metallic particle 7 (FIG. 1) passes through it. FIG. 2 shows a tube 8 which supports the primary coil 2 in the center and the secondary coils 3 disposed symmetrically on either side of the primary coil 2.

FIG. 2 also shows a system of coordinates in which the abscissa indicates the axis of the scanning coil and is marked with the distance from the origin in coil diameters. It should thus be imagined that the material flow passes along this axis and thus through the tube 8. By the symmetrical construction of the scanning coil and the reverse connection of its secondary coils 3, the output signal therefrom will be approximately zero for as long as no magnetic or electrically conducting objects appear in the sensing range of the coil. Now, if a conducting particle accompanies the material flow, for example in a direction from left to right, this will be influenced by the magnetic field of the scanning coil which, initially, will have its strongest influence on the lefthand secondary coil so that a negative difference voltage grows up on the secondary side. This signal increases to a maximum, the position of which depends on the coil dimensions. After that, the signal rapidly diminishes and becomes zero when the particle passes the primary coil, after which the signal equally rapidly grows up to a positive maximum value and then slowly decreases towards zero. Curve I in FIG. 2 shows this resultant signal on a linear scale, whereas curve II shows the signal on a logarithmic scale.

As a first example of an interference signal there may be imagined the signal coming from weakly conducting materials in the material flow, particularly if this weakly conducting material has relatively great extension. This may, for example, occur if it is a question of sorting out logs of wood in which embedded foreign metal particles that are invisible may cause great inconvenience and therefore must be detected and removed, but where also a soaking wet log may cause a signal for conducting material in spite of the fact that this log is completely harmless in the subsequent materials treatment and should not be removed.

Figure 3:
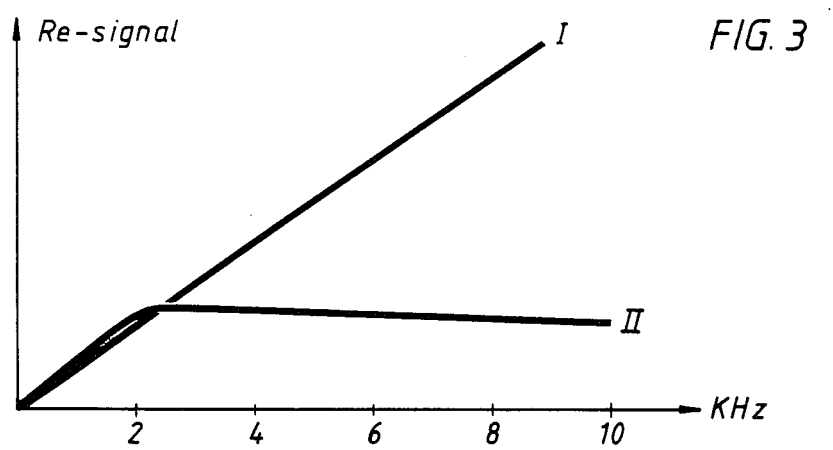
FIG. 3 is a graph showing the frequency response of the signals obtained from the scanning coil when material with different conductivities pass through it.

However, it has proved that the signal for different conducting materials entering the sensing range of the scanning coil is greatly frequency-dependent, and, in addition, this dependence is also a function of the conductivity of the material, as indicated in FIG. 3.

FIG. 3 shows the relationship between the frequency and the real portion of the signal from a conducting material, the abscissa indicating the frequency in kHz. Curve I represents a material with a low conductivity, in the present case a strong salt solution in a container, whereas curve II represents a metal particle of an extension of a few millimeters, for example a copper cylinder with a diameter of 5 mm. For the salt solution it is seen that the curve I increases linearly, whereas the curve II increases linearly up to, for example, a frequency of 2 kHz, whereupon it reaches saturation because of the current displacement.

To make use of the above-mentioned conditions, only the first two currents i1, i2, and thereby the voltages e1 and e2, are used in the connection according to FIG. 1, and the multiplier circuit 42 operates on the basis of the factor $-k \times (f1/f2)$. In this way, the output signal from the summator 6 will be:

$$F(e1) - k \times F(e2) \times (f1/f2) \qquad (1)$$

where $G = (f1/f2)$

If the frequencies f1 and f2 are chosen to be, for example, 2 and 8 kHz, for a weakly conducting material, such as wet wood material, the two terms in the above expression will be approximately equal if the factor k is chosen to be about 1, and the output signal will be zero. For a good conductor, the second term in the expression becomes small so that a substantial resultant output signal, i.e., f(e1), is obtained from the summator 6.

In addition to the fact that output signals from, for example, acidic materials are eliminated in this way, signals from very thin, conducting objects, such as aluminium foil, are also eliminated, and this is an advantage since previously such objects have given rise to unnecessary signals.

Another source of interference, which may cause undesired signals from the detecting device, are conducting materials in the vicinity of the scanning coil but not in the flow. It is easily understood how difficult it may be to avoid such disturbing background material in, for example, an industrial plant. It will be just as difficult to screen the scanning coil off from such disturbing material.

From FIG. 2 it will be clear that the sensitivity of the scanning coil is greatly reduced with the distance from the coil, and that the conducting particles which actually pass through the coil will result in a strong signal. It is also seen that the signal level at a distance of twice the diameter (D) of the coil is almost negligible in relation to the peak value of a genuine signal (FIG. 2). Therefore, if it were possible to avoid conducting materials within a zone with a radius of one to two times the diameter of the coil, a sufficiently strong signal should be obtained from particles passing through the coil compared with signals from similar particles outside this zone. However, the problem is that the curves in FIG. 2 relate to a particle of a certain size. With increasing size of the conducting object, the signal level is greatly increased, so that a large object relatively far away from the scanning coil may generate the same signal as a smaller particle inside the coil. However, the invention makes it possible to compensate for the dependence on the size of objects situated within the sensing range of the coil by taking note of the fact that the resistive eddy current losses are inversely proportional to the square root of the frequency, as shown in FIG. 4.

Figure 4:
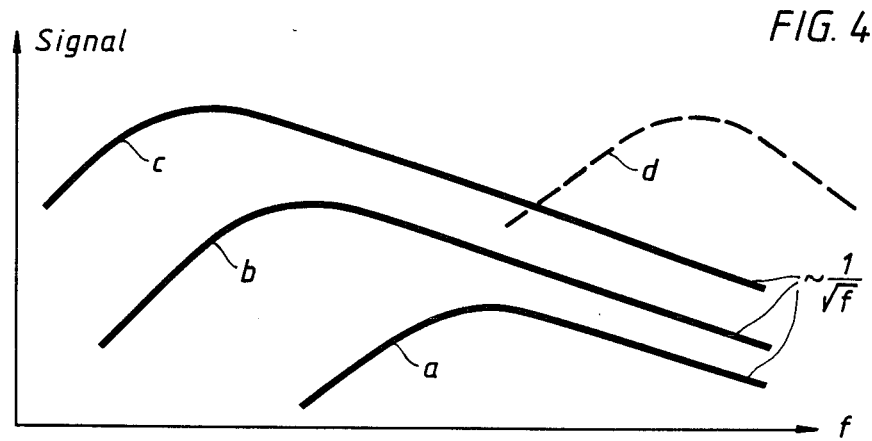
FIG. 4 shows in a similar manner how the size of conducting objects influences the signals.

The curves in FIG. 4 are, in principle, the same as the curve II in FIG. 3 with the difference that in FIG. 4 the abscissa and the ordinate have been made logarithmic. It will be seen that above a certain frequency, the curves decline linearly, corresponding to the inverse proportionality of the square root of the frequency. The maximum point of the curves varies in such a way that when the extension of the object increases, the maximum value will also increase while at the same time the position of the maximum occurs at a lower frequency. The curve will thus be displaced upwards to the left with increasing size of the object, so that curve a corresponds to the smallest object and curve c corresponds to the largest object. With increasing resistivity of the object material, the curves are displaced to the right so that if curve c represents, for example, copper, curve d could represent, for example, stainless steel, or the like, the objects having approximately the same size in both cases. For stainless steel, other curves corresponding to a and b may be imagined, which are only displaced to the right.

Figure 5:
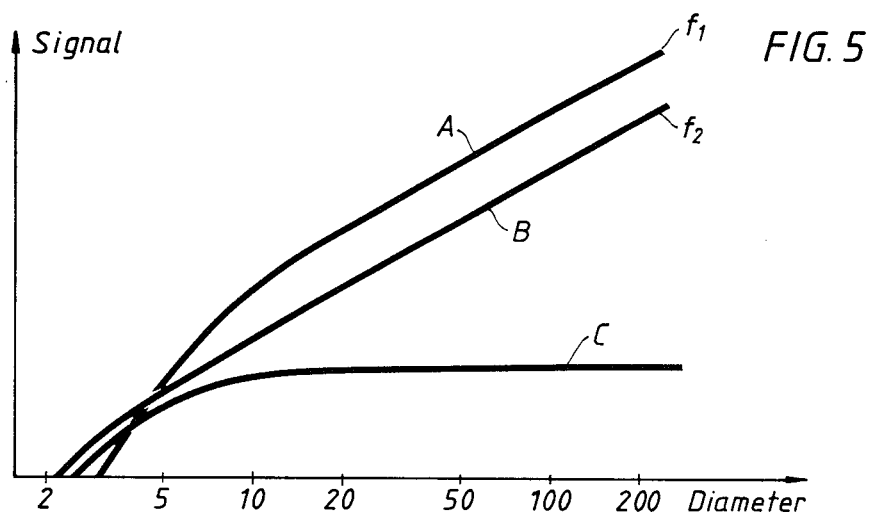
FIG. 5 shows how the signals can be made independent of this size.

FIG. 5 shows how the signal representing resistive losses varies with the size of the object at two different frequencies f1 and f2, where f2 is higher than f1. The abscissa represents the diameter of the object in millimeters on a logarithmic scale, whereas the ordinate indicates the signal also on a logarithmic scale. As mentioned with reference to FIG. 4, the signal increases with the size of the object and, above a certain frequency, decreases with the frequency so that curve A at a frequency f1 lies higher than the curve B at a frequency f2 for one and the same object. The curves A and B are approximately parallel over their linear parts so that, if a relative difference signal is formed between them, an almost constant signal according to curve C is obtained, that is, a signal which is approximately independent of the size of the conducting object. Such a subtraction of signals is performed in the device shown in FIG. 1 by the fact that the multiplier circuit 42 contains the square root of the frequency relationship so that the resulting signal output from summator 6 (FIG. 1) is:

$$k \times F(e2) \times \sqrt{\frac{f2}{f1}} - F(e1) \qquad (2)$$

As with the function (1) according to FIG. 3, k is of the order of 1; however, it may be desirable to let k have a value somewhat greater than 1, which means that the curve will not be completely horizontal but will rise somewhat with increasing size of the object, so that the device becomes somewhat sensitive to the size of conducting objects.

The main thing is, however, that with a signal function according to (2), the signal will mainly be dependent on the proximity of the object to the scanning coil. It will therefore be easy to restrict the output signal to that which occurs when an object passes through the coil, whereas weaker signals resulting from external objects are filtered off.

Figure 6:
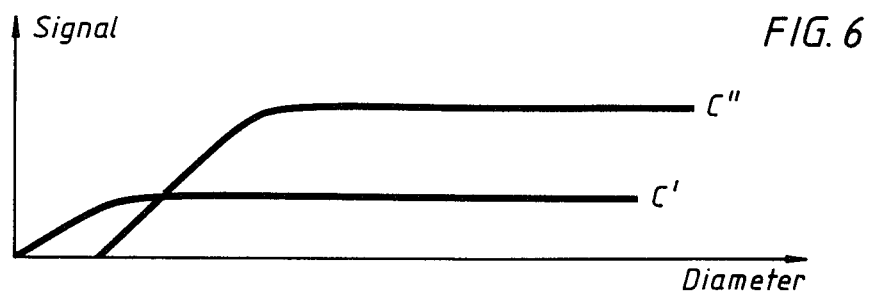
FIG. 6 shows how the size-independent signal changes with different conductivities.

As will be clear from FIG. 4, the signal according to the function (2) will be dependent on the conductivity of the objects which are to be detected in the material flow. This means that the curve C in FIG. 5 for materials having different conductivity will have different configurations as indicated in FIG. 6. In FIG. 6 the curve C' could represent copper and curve C" could represent stainless steel. This should be taken into consideration when choosing the frequencies f1 and f2.

However, the situation is often such that the object detected in the material flow (nails, pieces of iron and steel) have the same characteristic and, thereby, resistivity as the large objects which are included in structures in the vicinity of the coil, while at the same time objects of low resistivity (aluminium) are of little importance. In such a case, the frequencies are suitably chosen in such a way that the device becomes less sensitive to objects having low resistivity. On the other hand, if it is desired to distinguish good conductors in the material flow from large, poor conductors in the vicinity of the coil, it may be necessary to match together the signals F(e1) and F(e2) according to several different functions.

One such possibility is to introduce in FIG. 1 (as shown in dotted lines) an additional current source 13 with a frequency f3, as well as a corresponding phase-controlled rectifier 23, a filter 33 and a multiplier circuit 43, and matching these three signals together according to a suitable function. It may then be necessary, or at least desirable, to also include a multiplier circuit 41 in the output from the filter 31. Thus, the signal function will have the following appearance at the input to summator 6 in FIG. 1:

$$k1 \times F(e1) + k2 \times F(e2) + k3 \times F(e3) \qquad (3)$$

This signal function will be zero, or almost zero, both in the case of signals generated by poor conductors in the material flow and in case of signals generated by large objects in the vicinity of the coil but not in the flow.

From the comments given above with reference to FIGS. 3-5 it is clear that the voltages F(e) emanating from poorly conducting objects in the material flow substantially fulfil the relations $$\frac{F(e1)}{f1} = \frac{F(e2)}{f2} = \frac{F(e3)}{f3} \qquad (4)$$

and that the voltages F(e) emanating from larger conducting objects not in the flow but in the vicinity of the coil substantially fulfil the relations $$F(e1)\cdot\sqrt{f1} = F(e2)\cdot\sqrt{f2} = F(e3)\cdot\sqrt{f3} \qquad (5)$$

combining these three expressions, the following signal function results:

$$\sqrt{\frac{f2}{f1}}\left[\sqrt{\frac{f2}{f3}} - \frac{f3}{f2}(1-k)\right] \times F(e1) +$$

$$\left[\frac{f3}{f1} - \sqrt{\frac{f1}{f3}}\right] \times F(e2) + \left[\sqrt{\frac{f1}{f2}}(1-k) - \frac{f2}{f1}\right] \times F(e3)$$

in this expression a factor (1−k) has been introduced where k is a constant close to zero. The reason for this is that it is not often desired to completely compensate for the dependence on the size of the objects. It is often desirable to obtain a certain size dependence in the signal, and above all it is desirable to ensure that variations in the equipment do not cause over-compensation for the size, so that large objects in the flow give smaller signals than smaller objects. Experience has shown that a suitable value for k is between 0.01 and 0.1.

Although the above-mentioned expression seems fairly complicated, it is, however, often considerably simpler in practice. If, for example, k is chosen to be equal to 0 and f3=4f2=16f1, the following simple function is obtained after reduction:

$$-4F(e1)+9F(e2)-2F(e3)$$

What is claimed is:

1. A device for detecting the presence of metallic objects in a flow of non-metallic material, comprising:
   a scanning coil located in said flow and including a primary coil and a secondary coil;
   at least first and second current sources for providing at least first and second alternating currents at different frequencies to said primary coil;
   an output circuit responsive to the output signals of said secondary coil and providing an output when a metal object is sensed by said scanning coil;
   said output circuit including at least first and second means for respectively rectifying said output signals of said secondary coil corresponding to each of said first and second alternating currents and being respectively controlled by said first and second alternating current sources with a given phase angle relative to the respective alternating current thereof;
   at least first and second means for multiplying the respective outputs of said first and second rectifier means by respective first and second factors, with at least one of said first and second factors including a term representative of the relationship between the respective frequencies of said first and second alternating currents; and
   means for deriving an output signal from the difference between the respective outputs of said first and second means for multiplying, said output signal being representative of the presence of metallic objects in said flow of non-metallic material.

2. A device according to claim 1, in which said given phase angle is substantially zero.

3. A device according to claim 2, wherein said different frequencies are designated f1 and f2, respectively, said first factor is F(e1), where e1 is the voltage of said first alternating current source, and said second factor is F(e2)×k×f1/f2, where e2 is the voltage of said second alternating current source, k is a constant factor, and F(e1) and F(e2) are respective functions of the respective voltages e1 and e2, and said means for deriving an output signal determines F(e1)−k×f1/f2×F(e2).

4. A device according to claim 3, in which the factor k is substantially equal to unity.

5. A device according to claim 3, in which said secondary coil includes two secondary windings symmetrically disposed on opposite sides of said primary coil in the direction of material flow through said scanning coil.

6. A device according to claim 2, wherein said different frequencies of said first and second alternating current sources are respectively designated f1 and f2, said first factor is F(e1) and said second factor is $F(e2) \times k \times \sqrt{f2/f1}$, where e1 and e2 are the respective voltages of said first and second alternating current sources, k is a constant factor, and F(e1) and F(e2) are respective functions of the respective voltages e1 and e2, and said means for deriving an output signal determines $F(e1) - k \times \sqrt{f2/f1} \times F(e2)$.

7. A device according to claim 6, in which said secondary coil includes two secondary windings symmetrically disposed on opposite sides of said primary coil in the direction of material flow through said scanning coil.

8. A device according to claim 6, in which said constant factor k is substantially equal to unity.

9. A device according to claim 2, comprising: first second and third alternating current sources for providing respective first, second and third alternating currents at respectively different frequencies, f1, f2 and f3;
   first, second and third means for rectifying each of said first, second and third alternating currents and being respectively controlled by said first, second and third current sources;
   at least first, second and third means for multiplying the respective outputs of said first, second and third rectifier means by respective first, second and third factors, said first factor is k1×F(e1), said second factor is k2×F(e2) and said third factor is k3×F(e3);
   said means for deriving an output signal determines k1×F(e1)+k2×F(e2)+k3×F(e3), wherein k1, k2 and k3 are respective constant factors, and F(e1), F(e2) and F(e3) are respective functions of the respective voltages e1, e2 and e3;
   wherein the voltages generated from said secondary coil from weakly conducting objects in said material flow substantially fulfill the relationships:

$$F(e1)/\sqrt{f1} = F(e2)/\sqrt{f2} = F(e3)/\sqrt{f3},$$

and the voltages generated from said secondary coil from larger conducting objects in said material flow but in the vicinity of said scanning coil fulfill the relationships: $F(e1)\times\sqrt{f1}=F(e2)\times\sqrt{f2}=F(e3)\times\sqrt{f3}$, and the function k1×F(e1)+k2×F(e2)+k3×F(e3) is substantially zero.

10. A device according to claim 9, wherein
the function $k1 \times F(e1) + k2 \times F(e2) + k3 \times F(e3)$ equals
$\sqrt{f2/f1}[\sqrt{f2/f3} - f3/f2(1-k)] \times F(e1) + [f3/f1 - \sqrt{f1/f3} \times F(e2) + [\sqrt{f1/f2}(1-k) - f2/f1] \times F(e3)$,
and wherein
k is a constant close to zero.

11. A device according to claim 9, in which said secondary coil includes two secondary windings symmetrically disposed on opposite sides of said primary coil in the direction of material flow through said scanning coil.

12. A device according to claim 1, in which said different frequencies of said first and second alternating currents are evenly divisible by two.

* * * * *